May 29, 1956
R. CLADE
2,747,905
COMPOSITE GASKET FORMED IN SITU
Filed Aug. 18, 1950
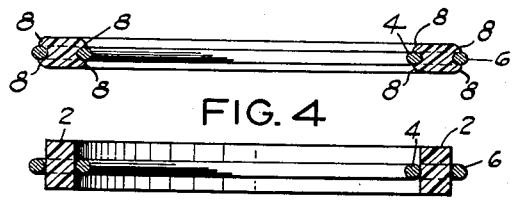
FIG. 4
FIG. 3
FIG. 2
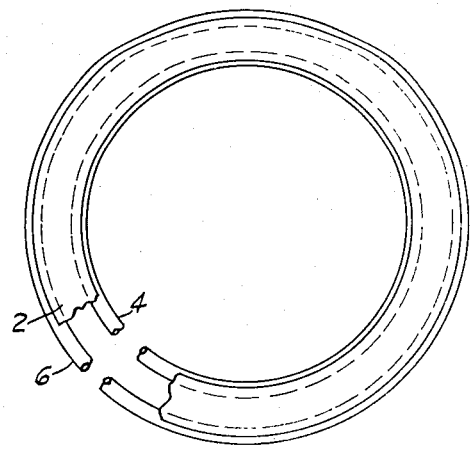
FIG. 1
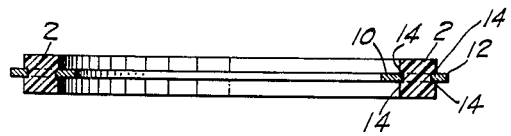
FIG. 5
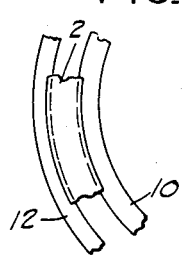
FIG. 6
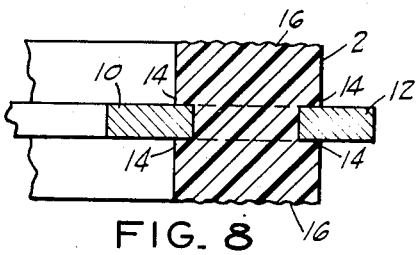
FIG. 8
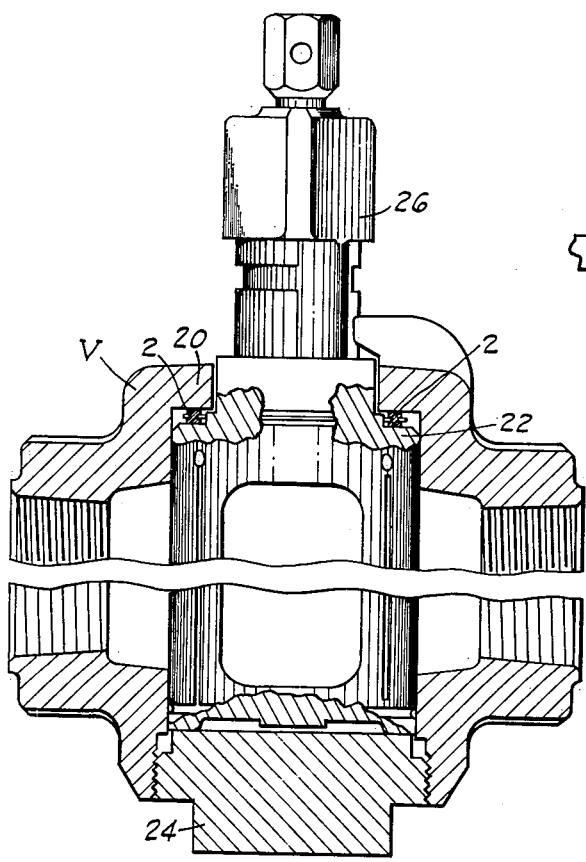
FIG. 7
INVENTOR
Robert Clade
BY
Robert A. Shields
ATTORNEY

United States Patent Office 2,747,905
Patented May 29, 1956

2,747,905
COMPOSITE GASKET FORMED IN SITU

Robert Clade, Detroit, Mich., assignor, by mesne assignments, to W-K-M Manufacturing Company, Inc., a corporation of Delaware Application August 18, 1950, Serial No. 180,223

5 Claims. (Cl. 288—20)

This invention relates to gaskets in general and in particular to gaskets which are formed in situ.

The rapid development of new products, many of which have to be handled at high temperatures, has rendered the bulk of the gasket materials obsolete and there are at present no materials which can withstand the corrosive action of the new products and the elevated temperatures frequently necessary. Among the new products recently developed is a plastic formed by the polymerization of tetrafluoroethylene, which product is very resistant to attacks of substantially all known materials and which is also very stable under high temperatures. An object, therefore, of the present invention is the provision of a gasket formed of polytetrafluoroethylene.

A further object of the invention is the provision of a chemically inert gasket reenforced against flowing by metallic restraining parts.

A yet further object of the invention is the provision of a chemically inert gasket material locked to reenforcing rings by flowing of the gasket material over the rings under pressure.

Still another object of the invention is the formation of a gasket in position between a valve body shoulder and a valve plug whereby irregularities of the parts are formed in the gasket.

These and other objects of the invention will be apparent to persons skilled in the art from a study of the following description and accompanying drawings, in which Fig. 1 is a plan view of the improved gasket with parts broken away to better disclose the construction;

Fig. 2 is a sectional view showing the plastic cylinder portion of the gasket;

Fig. 3 is a sectional view showing the plastic cylinder with reinforcing rings in position;

Fig. 4 is a sectional view of the completed gasket after pressure has been applied to the ends of the cylinder;

Fig. 5 is a sectional view similar to Fig. 4 but showing a slight modification in the cross-sectional shape of the reinforcing rings;

Fig. 6 is a fragmentary plan view of the modification shown in Fig. 5;

Fig. 7 is a sectional view taken through a valve and showing how the gasket is formed in situ; and Fig. 8 is an enlarged fragmentary sectional view of the completed gasket.

Referring now to the drawings in detail it will be seen that the gasket is formed of a central cylindrical portion 2 preferably made of a plastic such as polytetrafluoroethylene. Inside the plastic cylinder is fitted a ring 4 having an outside diameter substantially equal to the inside diameter of the plastic cylinder. Located outside of the cylinder is a ring 6 having an inside diameter substantially equal to the outside diameter of the plastic cylinder. These rings 4 and 6 are preferably made of some strong material such as steel and are provided for the purpose of controlling the lateral flow of the plastic under pressure. Application of pressure to the ends of the plastic cylinder will cause the same to flow producing a generally I shape cross section with the arms producing lips 8 which overlap the rings 4 and 6 and lock the same in position, thus the rings 4 and 6 reinforce the plastic cylinder and the rings and cylinder mutually interact to hold the parts in assembled position.

In some instances it may be more desirable to make the rings 4 and 6 rectangular as shown in Figs. 5, 6 and 8. In this case the inner ring 10 and outer ring 12 are both of rectangular cross-section and are overlapped by the lips 14 formed by the application of pressure to the ends of the plastic cylinder 2. As indicated in Fig. 8 the end surfaces 16 of the plastic cylinder will be rough exactly in accordance with the machining marks on the parts with which the gasket cooperates in service.

In forming the gasket the cylindrical plastic will be provided as shown in Fig. 2 and into and over this will be fitted the reinforcing rings of any desired cross-section and in the manner as shown in Fig. 3. The assembly as shown in Fig. 3 will then preferably be inserted between the relatively moving parts, such as shoulder 20 and plug 22, of the valve V. With the assembly in this position pressure will be applied to the base of the plug by means of a base cap 24 and during application of the pressure the plug stem 26 will be turned or oscillated so that the plastic material will have its end surfaces conformed to the machining marks of the plug and shoulder and will be additionally worked to assist the flowing of the plastic material over the reinforcing rings to form the lips 8 or 14 which grip the reinforcing rings and give the material its I shape cross section. As an alternative the assembly could be placed in a power press and formed to produce the desired gasket in which case the conforming to tool marks would occur upon insertion into the valve.

It will thus be seen that a simple and efficient gasket has been provided which may be easily and quickly formed in situ and which will have its surfaces conforming to the surfaces of the parts with which it is to be used. By use of the reinforcing rings the effective column height of the plastic cylinder is cut down and the flow of the material under pressure can be controlled while still providing sufficient plastic bearing area in direct contact with the relatively movable parts which are to be sealed. Application of forming pressure to the gasket should be substantially equal to or greater than the working pressure to which the gasket will be subjected. While the invention has been described more or less in detail with specific reference to the drawings and one preferred plastic, it will be obvious that other plastics and forms of reinforcing rings may be utilized without departing from the scope of the invention as defined by the following claims.

What is claimed is:

1. A gasket for insertion between overhanging surfaces comprising, a pair of substantially concentric reinforcing ring members inclosing an annular area, and a resilient member positioned in and completely filling said annular area and having portions overlapping the upper-most and lower-most portions of said rings whereby said members are mutually held in assembled position and said rings are maintained out of contact with the overhanging surfaces.

2. A gasket for insertion between overhanging surfaces comprising, a pair of substantially concentric metallic reinforcing ring members inclosing an annular area, and a filler member of polytetrafluoroethylene generally I-shaped in cross section positioned in said space and having portions overlapping the upper-most and lower-most portions of said ring members to hold the same in position in spaced relation to the overhanging surfaces.

3. A gasket for insertion between overhanging surfaces comprising, a pair of substantially concentric metallic reinforcing ring members inclosing an annular area, and a filler member of polytetrafluoroethylene generally I-shaped in cross section positioned in said space and having the arm portions pressure flowed into overlapping relationship with the upper-most and lower-most surfaces of said ring members to hold the same in assembled position and to prevent contact of the rings with the overhanging surfaces.

4. A gasket for insertion between overhanging metallic surfaces comprising inner and outer substantially concentric metallic reinforcing rings, and a plastic filler member generally I-shaped in cross section positioned between said metallic rings and having the arm portions of the I shape overflowing the upper-most and lower-most portions of said rings to hold the same in assembled position and out of contact with the metallic surfaces.

5. The method of forming a gasket for use between two relatively rotatable surfaces which comprises forming a substantially smooth walled plastic cylinder of predetermined length, forming a first ring having an outside diameter substantially equal to the inside diameter of the cylinder and a thickness materially less than the cylinder length, forming a second ring having an inside diameter substantially equal to the outside diameter of the cylinder and a thickness materially less than the cylinder length, sliding the rings onto the cylinder to a position substantially midway of the ends to form an assembly, placing the assembly in position with the cylinder ends each engaging one of said relatively rotatable surfaces, and applying pressure to the surfaces to compress the cylinder until the plastic overlaps the upper-most and lower-most portions of the ring while simultaneously relatively rotating the surfaces whereby to conform it to the engaging surfaces.

References Cited in the file of this patent

UNITED STATES PATENTS

| | | |
|---|---|---|
| 368,189 | Carter | Aug. 16, 1887 |
| 870,428 | Graham | Nov. 5, 1907 |
| 1,854,708 | Mastin et al. | Apr. 19, 1932 |
| 1,909,478 | Wilson | May 16, 1933 |
| 1,942,703 | Hubbard | Jan. 9, 1934 |
| 2,070,000 | Clade | Feb. 9, 1937 |
| 2,182,614 | Garrison | Dec. 5, 1939 |
| 2,456,262 | Fields | Dec. 14, 1948 |
| 2,467,312 | Jack | Apr. 12, 1949 |

FOREIGN PATENTS

| | | |
|---|---|---|
| 15,850 | Great Britain | Sept. 18, 1891 |